United States Patent [19]

Muller

[11] 4,162,633

[45] Jul. 31, 1979

[54] BALANCING MACHINE

[75] Inventor: Richard Muller, Lynchburg, Va.

[73] Assignee: Gebr. Hofmann G.m.b.H. & Co. KG, Mashinenfabrik, Pfungstadt, Fed. Rep. of Germany

[21] Appl. No.: 922,053

[22] Filed: Jul. 5, 1978

[30] Foreign Application Priority Data

Jul. 6, 1977 [DE] Fed. Rep. of Germany ....... 2730439

[51] Int. Cl.² ............................................. G01M 1/22
[52] U.S. Cl. ...................................................... 73/462
[58] Field of Search ................................... 73/462–466

[56] References Cited

U.S. PATENT DOCUMENTS 3,102,429  9/1963  Hardy et al. ........................... 73/462

Primary Examiner—James J. Gill
Attorney, Agent, or Firm—Cushman, Darby & Cushman

[57] ABSTRACT

An apparatus for balancing bodies of rotation in which the body is mounted for rotation while supported at two points. Two load cells are located at each point for producing an unbalance signal. One load cell at each point is connected to measuring electronics which indicate the amount of unbalance while the other cell is connected to processing electronics which indicate amount and location and transmit a signal to a processing machine.

1 Claim, 1 Drawing Figure

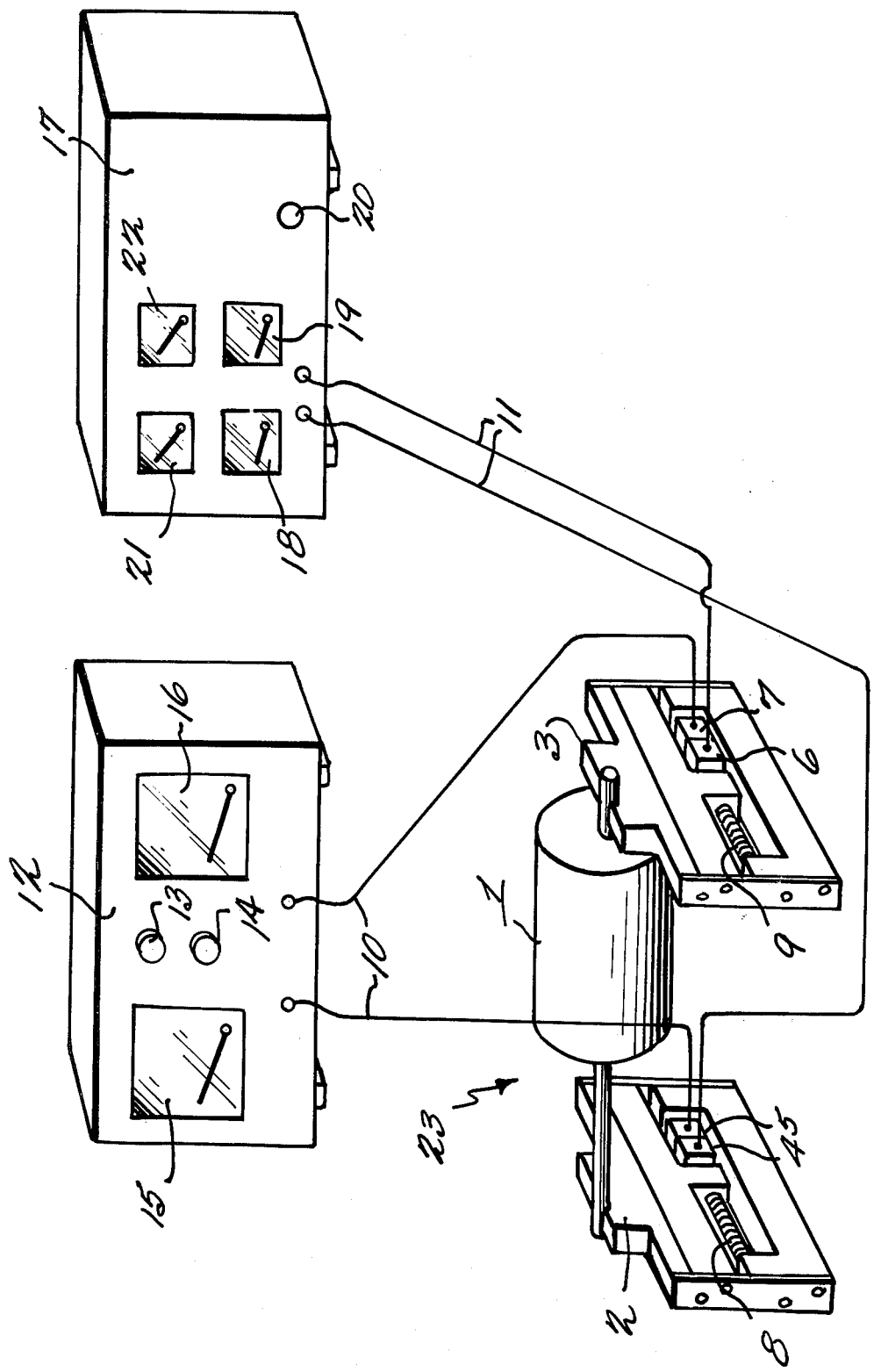

BALANCING MACHINE

The invention relates to apparatus for the balancing of bodies of rotation whereby the mass compensation is carried out by a processing machine controlled by a measuring device and a subsequent control on the same measuring device with regard to the balancing accuracy required.

Apparatus for the balancing of bodies of rotation are used particularly for production balancing whereby the measuring values of unbalance of an unbalanced rotor are determined on a measuring device during rotation and are stored. After the rotor has been rotated to a proper position in the processing machine, the mass compensation can be manually or automatically carried out based on the stored measuring values.

Before balancing, a test run often is carried out on a separate measuring device or on the first measuring device. The measuring electronics may be additionally equipped with switches for threshold values producing a signal when the tolerance is achieved so that a quick and simple good - not good indication can be given.

For balancing machines where the test run is carried out on the first measuring device, however, there is the disadvantage that the unbalance of the bodies of rotation is not or is only incorrectly determined in the case of a failure of the measuring device respectively either of the measuring pickups of the supply lines of those bodies, or of the occurrence of friction in the work supports which results in the incorrect control of the machining tools or an incorrect classification of the balancing state of the body of rotation already being compensated.

In order to eliminate this disadvantage, a second measuring device is generally used for the control. However, this requires a complete measuring machine with a measuring device connected thereto which is required only for furnishing information about the balancing accuracy of the rotor.

By the use of two measuring machines, each connected with a separate measuring electronics, an incorrect classification of the balancing state is almost impossible.

To obtain more accurate balancing, a further measuring of unbalance followed by precision correction of the mass compensation after mass compensation is necessary. The signals for precision mass compensation are accommodated and stored by the same measuring electronics provided for the rough mass compensation. The precision machining is also carried out by the same processing machine which had carried out the rough mass compensation.

The difficulty with two separate measuring devices is that the rotor can be measured on the control machine after rough mass compensation is carried out, but it has to be placed again on the measuring machine if it is without the tolerance required so that the measuring values necessary for precision mass compensation can be fed into the storage for the control of the processing unit.

To avoid this complicated and time-consuming procedure and to obtain an accurate control of the rotor, the equipment for the balancing of bodies of rotation provides in accordance with the invention that the measuring machine has two mechanically connected measuring pickups whereby one of those is connected to the measuring electronics and the other to the control electronics.

The measuring device is preferably constructed as a hard bearing machine whereby the measuring electronics takes charge of the control of the machining tool and the control electronics only measures and stores the values for unbalance.

It is advantageous to use a hard bearing machine because the work supports are not equipped with moving parts and changes in the spring elements are practically without any influence on the measuring result. In the case of a failure of one measuring pickup or the connection cable thereof, one of the two electronics will not carry out its function and from a comparison of the measurements between the two measuring electronics, any error will immediately be apparent.

Referring to the drawings, a rotor 1 is loaded into prism bearings 2 and 3 of conventional measuring apparatus 23. The bearing forces produced during the rotation in the prism bearing are detected in load cells by the conveiontal measuring pickups 4 and 5 mechanically connected in the prescribed example of operation and are converted into electrical voltages. Pressure spring 8 initially stresses both load cells 4 and 5. The forces accommodated by the support 3 are converted into electrical alternating voltages by the load cells 6 and 7. A pressure spring 9 serves also for the initial stress of these load cells. The voltages are proportional to the forces of unbalance of the left and right bearings and are fed into conventional control electronics 12 from the load cells 5 and 7 via cables 10 and from load cells 4 and 6 via cables 11 to measuring electronics 17. The control electronics 12 diplays only values of unbalance on displays 15 and 16. A control light 13 indicates when the tolerance is exceeded and the control light 14 indicates when the tolerance is achieved. Measuring electronics 17 measures and stores the unbalance values and transmits the stored unbalance values via the cable 20 to a conventional processing machine (not shown). The measuring instruments 18 and 19 indicate the amount of unbalance; and the instruments 21 and 22, the angular location of unbalance.

If a rotor 1 to be balanced is already indicated within tolerance at the control electronics 12 it is not forwarded to the processing machine. If it is without tolerance, the values required for machining are already stored in the measuring electronics 17 and the rotor 1 can be forwarded for machining. If the rotor 1 machined is again returned into the measuring machine 23, the control electronics 12 can decide during the test run whether the rotor 1 has already achieved balancing accuracy. If not, the measuring values for machining of unbalance are again in the storage of the measuring electronics 17 and a finishing can be started. The measuring electronics 17 may be additionally equipped with a switch for threshold values for the indication of the limit of the tolerance in order to guarantee a mutual control of both measuring electronics 12 and 17.

Many changes and modifications can be carried out with regard to the illustrative embodiments without departing from the scope of the present invention, that scope being limited only by the scope of the appended claims.

What is claimed is:

1. An apparatus for balancing bodies of rotation comprising:
    support means for supporting a body at two points during rotation;

two measuring load cells at each said point for each producing a signal indicating unbalance;
measuring electronics for determining and indicating the amount of unbalance;
processing electronics for determining and indicating the amounts and locations of unbalance and for transmitting said amounts and locations to a processing machine for correcting unbalance; and
means for connecting one of said cells at each of said points to said measuring electronics and the other to said processing electronics.

* * * * *